(12) United States Patent
Memoli et al.

(10) Patent No.: US 11,389,873 B2
(45) Date of Patent: Jul. 19, 2022

(54) METHOD FOR PRODUCING METAL POWDERS BY MEANS OF GAS ATOMIZATION AND PRODUCTION PLANT OF METAL POWDERS ACCORDING TO SUCH METHOD

(71) Applicant: TENOVA S.P.A., Milan (IT)

(72) Inventors: Francesco Memoli, Pittsburgh, PA (US); Michela Boccadoro, Genoa (IT)

(73) Assignee: TENOVA S.P.A., Milan (IT)

( * ) Notice: Subject to any disclaimer, the term of this patent is extended or adjusted under 35 U.S.C. 154(b) by 203 days.

(21) Appl. No.: 16/604,051

(22) PCT Filed: Apr. 12, 2018

(86) PCT No.: PCT/IB2018/052560
§ 371 (c)(1),
(2) Date: Oct. 9, 2019

(87) PCT Pub. No.: WO2018/189708
PCT Pub. Date: Oct. 18, 2018

(65) Prior Publication Data
US 2021/0101211 A1      Apr. 8, 2021

(30) Foreign Application Priority Data
Apr. 13, 2017   (IT) ........................ 102017000041618

(51) Int. Cl.
*B22F 9/08*      (2006.01)

(52) U.S. Cl.
CPC ...... *B22F 9/082* (2013.01); *B22F 2009/0848* (2013.01); *B22F 2009/0888* (2013.01); *B22F 2009/0896* (2013.01)

(58) Field of Classification Search
None
See application file for complete search history.

(56) References Cited

U.S. PATENT DOCUMENTS 3,356,489 A * 12/1967 Feichtinger ........... C21C 7/0043
                                                    75/10.47
3,598,571 A *  8/1971 Moffatt ..................... C21C 5/56
                                                     75/525
(Continued)

FOREIGN PATENT DOCUMENTS

CN        2855596 Y     1/2007
CN      102689015 A     9/2012
(Continued)

OTHER PUBLICATIONS

Russian Office Action and Search Report dated Mar. 3, 2021 in Russian Patent Application No. 2019132820/05(064618) (with english language translation), 26 pages.
(Continued)

*Primary Examiner* — George Wyszomierski
(74) *Attorney, Agent, or Firm* — Oblon, McClelland, Maier & Neustadt, L.L.P.

(57) ABSTRACT

A method for producing metal powders by gas atomization is provided, including providing a metal charge; melting the metal charge inside an electric-arc furnace, controlling its composition until a molten metal bath having a desired composition is obtained; tapping the bath from the furnace, collecting it inside a ladle; refining the bath under controlled atmosphere, vacuum, or overpressure condition; atomizing the refined bath by feeding it into a gas atomizer, inside which a molten metal bath flow is produced, and impinging the molten metal bath flow with an atomization inert gas stream for the atomization of the molten metal bath into metal powders; and extracting the obtained metal powders from the gas atomizer.

8 Claims, 1 Drawing Sheet

(56) References Cited

U.S. PATENT DOCUMENTS

| | | | | |
|---|---|---|---|---|
| 3,655,837 A * | 4/1972 | Reed et al. | ............. | B22F 9/082 |
| | | | | 264/6 |
| 4,365,944 A | 12/1982 | Pajonk et al. | | |
| 2015/0059526 A1* | 3/2015 | Vikner | .................... | B22D 41/14 |
| | | | | 75/338 |
| 2016/0144435 A1* | 5/2016 | Banik | ..................... | B22F 9/082 |
| | | | | 75/338 |
| 2017/0209954 A1 | 7/2017 | Kato et al. | | |
| 2020/0122237 A1* | 4/2020 | Kemper | .................. | B22F 3/003 |
| 2021/0164090 A1* | 6/2021 | Zeng | ......................... | B22F 9/08 |

FOREIGN PATENT DOCUMENTS

| | | |
|---|---|---|
| CN | 104249157 A | 12/2014 |
| CN | 104525960 A | 4/2015 |
| DE | 30 24 752 A1 | 2/1982 |
| EP | 3 173 499 A1 | 5/2017 |
| GB | 2 081 748 A | 2/1982 |
| JP | 54-139870 A | 10/1979 |
| JP | 61-130406 A | 6/1986 |
| JP | 4-202706 A | 7/1992 |
| JP | 7-113107 A | 5/1995 |
| RU | 2 203 775 C2 | 5/2003 |
| SU | 1353580 A1 | 11/1987 |
| WO | WO 2016/013498 A1 | 1/2016 |

OTHER PUBLICATIONS

International Search Report dated Aug. 13, 2018 in PCT/IB2018/052560 filed Apr. 12, 20118.

Combined Chinese Office Action and Search Report dated Dec. 24, 2021 in corresponding Chinese Patent Application No. 201880024772.5 (with English Translation) 21 pages.

* cited by examiner

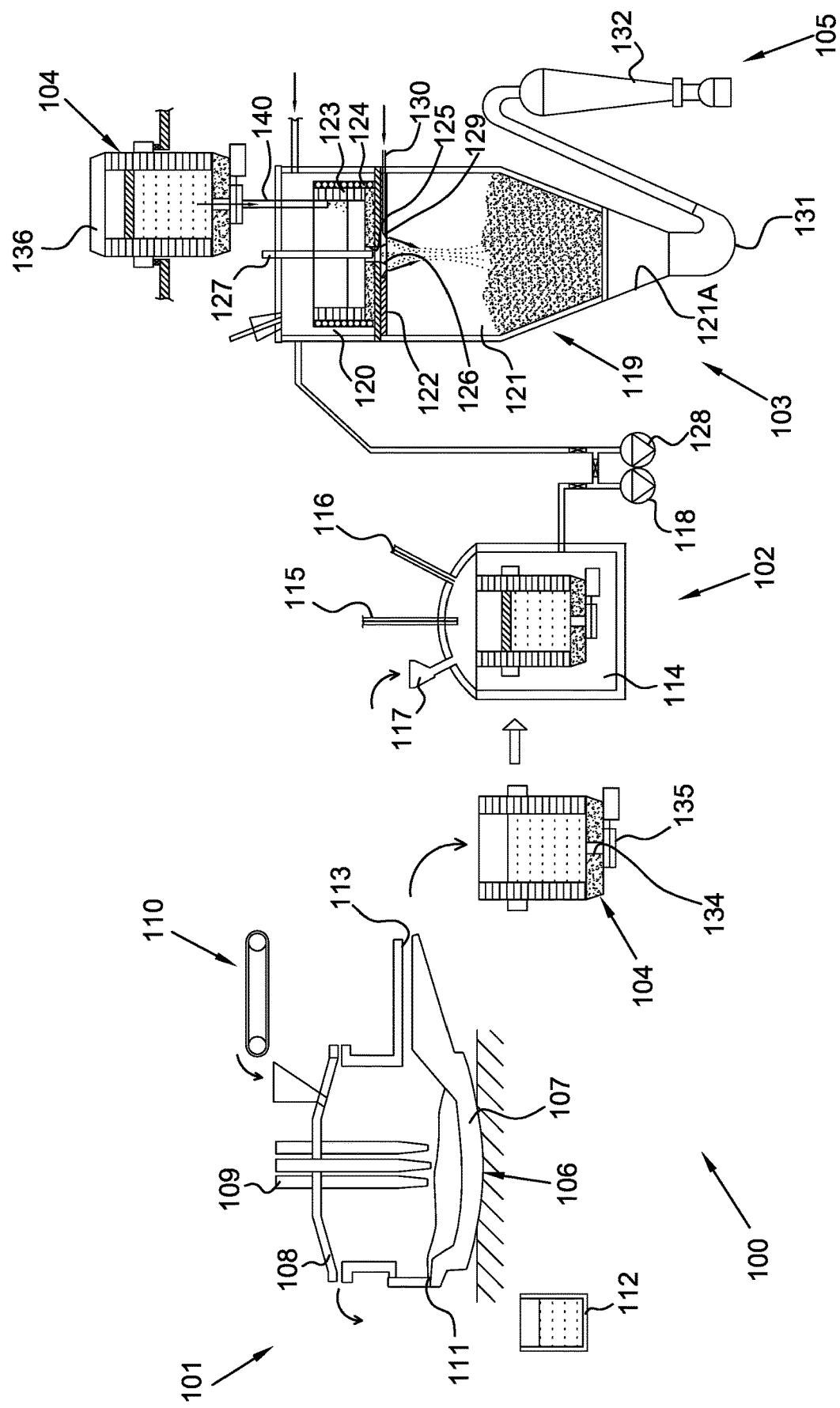

METHOD FOR PRODUCING METAL POWDERS BY MEANS OF GAS ATOMIZATION AND PRODUCTION PLANT OF METAL POWDERS ACCORDING TO SUCH METHOD

The present invention relates to a method for producing metal powders by means of gas atomization and to a production plant of metal powders according to such method.

In particular, the present invention relates to a method and to a plant for producing iron, steel, nickel, molybdenum, chromium, cobalt powders and their alloys.

The use of metal powders obtained by gas atomization is increasingly frequent in the so-called field of "powder metallurgy".

The metal powders obtained by gas atomization are used in particular in the so-called "additive production" or three-dimensional printing of products also having complex shapes.

The most common additive production process (or three-dimensional printing) using metal powders as base material is the so-called melting process of a powder bed, in which successive layers of metal powders forming the product to be obtained are melted by means of a laser or other equivalent energy radiation beam. This process is implemented with different technologies: selective laser melting (SLM), direct metal laser sintering (DMLS) and others.

The chemical and physical characteristics of the metal powders used as base material are of fundamental importance for implementing and controlling these production processes. With regard to the physical characteristics, the metal powders in particular must have controlled and uniform density, grain size and shape. In general, the metal powders used must have average sizes ranging between 5 μm and 250 μm and a spherical shape, the latter necessary for ensuring evenness of the powders. Different production methods of metal powders are known, among which the ones by atomization, wherein a molten metal flow is injected into a closed chamber where it is impinged with jets of a high speed or high kinetic energy atomization fluid. These jets yield energy to the molten metal flow, pulverizing it into particles which move at high speed, solidifying and cooling in the shape of powders that are collected on the bottom of the closed chamber. The shape of the powder particles depends on different factors, such as the temperature, the viscosity and the surface tension of the molten metal, and the acceleration acquired thereby.

It is possible to use water or a gas as atomization fluid, in particular an inert gas like argon or nitrogen.

However, water atomization does not allow obtaining metal powders having regular spherical shape or having the desired grain size distribution; moreover, it leads to problems of contamination of the metal powders produced.

Gas atomization instead allows obtaining spherical-shaped metal powders having a given grain size distribution and therefore it is the most commonly used production method.

Currently most widespread metal powder production plants by gas atomization comprise an atomizer formed by a cylindrical, vertically developing housing internally divided into an upper closed chamber and a lower closed separated from each other by a plate.

The upper closed chamber is provided with a removable upper closure cover and houses therein:
 a tundish provided with a heating system of the induction type and controlled electronically from the outside of the upper closed chamber; and
 a melting furnace crucible, which is also provided with a heating system of the induction type and is controlled electronically from the outside of the upper closed chamber.

On the bottom of the tundish, at least one outflow opening or nozzle is formed, which is arranged at and communicates with a corresponding through opening obtained in the separating plate of the two chambers. The outflow opening or nozzle may be associated with removable occlusion means that can be controlled from the outside of the upper closed chamber.

The crucible is supported by a tilting system by means of which it is inclined so as to pour the molten metal formed therein, into the tundish.

The upper closed chamber is then connected to a vacuum (suction) generating system which, during each production cycle, generates and maintains vacuum conditions inside the upper closed chamber so as to limit the dissolution of gas within the molten metal.

One or more outflow nozzles of an atomization gas—typically argon or nitrogen—are associated with the separating plate of the two chambers or in any case are arranged inside the lower closed chamber and are connected to a feed system of such atomization gas.

The bottom of the lower closed chamber is connected to a discharge system of the powders formed and collected therein. The discharge system is for example pneumatic and communicates with a powder classification device that classifies the powders based on their grain size and which, for example, is of the cyclone, sieve type, or other known systems.

Plants related to this type are for example disclosed in U.S. Pat. Nos. 4,343,750, 4,272,463, 3,695,795 and 3,752,611. The operation of these known plants provides introducing a metal charge in the solid state into the induction furnace crucible housed in the upper closed chamber of the atomizer.

After closing the upper closed chamber and creating the desired vacuum conditions therein, the metal charge that was introduced into the crucible is heated up to a temperature exceeding the one of melting.

The composition of the molten metal that is formed inside the induction furnace crucible may be controlled by analysing samples of molten metal taken with a sampling system with which the upper closed chamber is equipped. Should the composition of the samples taken not meet the fixed parameters, it is possible—within certain limits—to correct it by introducing additive materials into the induction furnace crucible by means of suitable lances that cross the upper closed chamber.

The metal melting step is called vacuum induction melting, precisely occurring in an induction furnace housed in the upper closed chamber of the atomizer, chamber in which vacuum conditions are created.

The molten metal thus formed is then poured into the tundish. For such purpose, the tilting system is controlled to incline the crucible towards the tundish so that the molten metal contained in the crucible flows through a spout obtained at the upper end thereof, to be poured into the tundish.

The molten metal transferred into the tundish is maintained at the desired temperature by the induction heating system with which the latter is provided.

The outflow opening of the tundish is freed (opened) from the occlusion means and the molten metal flows into the lower closed chamber where it is impinged by one or more atomization gas jets that pulverize it into particles, which solidify and cool down, collecting on the bottom of the lower closed chamber from where they are then extracted, for example pneumatically, and transported towards the cyclone and/or sieve or other grain size classification system.

The shape and the sizes of the particles formed depend on different factors, including, in particular, the flow rate, the speed and the temperature of the molten metal flow that flows out of the tundish into the lower closed chamber. Therefore, it is particularly critical to control the level of the molten metal that fills the tundish and accordingly to control the inclination of the crucible that feeds the molten metal into the tundish itself.

Typically, the metal powders obtained have spherical shape of average diameter comprised between 1 μm and 300 μm, although it is possible to obtain different grain size distributions by intervening on the process parameters.

These known production plants and methods have certain drawbacks that limit their production capacities and negatively affect the production costs of the metal powders, quality and quantities required by the additive production technologies.

A first drawback consists in the fact that these known plants use—as metal charge materials—solid metal ingots or bars of defined sizes and which composition is close to the one of the metal powders to be produced. This is because such metal materials are melted directly in the induction furnace inside the atomization unit, where only limited adjustment interventions of the composition of the molten metal and refining interventions of the same are possible, and where the metal charge must have composition, density and also sizes suitable for being melted in the induction furnaces that usually equip the known atomization units.

For example, in the case iron or steel metal powders are to be produced, ingots or bars are used with carbon content not exceeding the one desired in the final product and, generally, with a reduced impurity content. This is because in known plants, it would not be possible to conduct the necessary secondary metallurgy and decarburization operations inside the induction furnace crucible housed in the upper closed chamber of the atomization unit. Indeed, it is not sized or equipped to conduct refining operations (decarburization and in any case secondary metallurgy), which require a controlled feed of additive materials, for example decarburizers that may develop increased volumes of slag that are difficult to manage.

The metal materials that form the charge used to conduct the known atomization plants also must have appropriate shape (like ingots or bars) and reduced sizes, such as to be transportable in the conduits that usually feed the upper closed chamber containing the induction furnace crucible. Therefore, the metal materials used for conducting known atomization plants must be prepared previously so that they have the desired composition, shape and sizes. In fact, they are prepared by means of known melting, refining, forming and solidifying technologies in the desired composition and shapes and sizes, in separate and distinct production plants from the atomization plant that then uses them as incoming "raw materials".

Therefore on the one hand, known atomization plants are capable of processing only a limited range of metal materials used as incoming "raw materials". If, for example, ferrous/steel metal powders or metal powders of another nature are to be produced, for example in known atomization plants it is not possible to use metal charges formed by generic metal scraps, metal minerals or also scrap metal powders; these indeed have compositions, sizes and densities that make them unsuitable for being directly processed in known atomization plants and in particular in the induction furnaces that are normally used in known atomization units.

On the other hand, the production of metal materials having composition, shape and sizes such as to make them suitable for being successively processed as "raw materials" in known atomization plants involves an increase in the production costs of the metal powders themselves, in addition to significant energy expenditures and polluting environmental emissions. These metal materials (ingots or metal bars having a desired composition) indeed are in turn produced with melting, refining, forming and solidifying technologies in separate and distinct plants from the atomization plants in which they are successively transported and stored to then be used as incoming "raw materials" to the atomizer in which they are subjected to a further melting and solidifying cycle for the production of metal powders.

Another drawback of known atomization plants consists in the fact that they have poor performance. Indeed, generally the metal powders of suitable grain size for use as base material for additive production technologies (typically in the order of 15 μm-50 μm) represent 30%—rarely 50%—of the total of the metal powders produced. The metal powders that do not meet the grain size parameters required to be used as base material for additive production technologies are scrapped and/or sold for other purposes. Indeed, the scrap metal powders may not be reused as charge materials for conducting known atomization plants; this because induction furnaces operating in such known atomization plants are configured, sized and conducted so as to melt ingots, bars and in general, metal materials having increased density and defined sizes operating at lower frequencies than the ones that would instead be necessary for melting the metal powders.

Another drawback again of known atomization plants and methods consists in the fact that the steps of melting, controlling the composition of the molten metal and atomization of the molten metal are conducted inside a single unit or component: the atomizer consisting of a single cylindrical housing divided into the upper closed chamber, wherein the melting occurs, and, to a certain extent, the control of the composition of the molten metal, and the lower closed chamber, wherein the atomization occurs. In addition to resulting in a significant vertical volume of known atomization plants, this results in a reduction of their productivity. The various production steps indeed occur one after the other; so for example, the atomization step may start only at the end of the steps of melting and controlling the composition of the molten metal and the start of a new melting step may only occur after the completion of the previous atomization step. In this respect, it is worth noting that the sole melting step on average requires an execution time equal to the sum of the times required for executing the steps of controlling the composition of the molten metal and the atomization thereof.

Moreover, with regard to the step of controlling the composition of the molten metal formed in the induction furnace crucible, it requires successive samplings and adjustments with the addition of additive materials, these last operations requiring lengthy execution times that penalize the overall productivity of the plant.

Another drawback again of known atomization plants and methods consists in the fact that they are not very flexible or versatile, thus allowing a limited range of metal powders of different quality to be produced. On the one hand, these limits result from the restrictions in the selection of the metal materials that can be used as charge for the conduction of these known plants and methods, and, on the other hand, in the inherent difficulties in adapting the known plants to a production change. Indeed, should metal powders of different type/quality be produced, it is necessary to subject the whole plant to accurate cleaning operations and/or replace all its parts in order to avoid possible contaminations of the metal powders to be produced. In particular, the induction furnace crucible is to be wholly replaced. In the same way, the tundish and the lower closed chamber are to be wholly replaced. These operations are economically costly and entail lengthy execution times during which the plants are stopped.

Again another drawback of known atomization plants and methods consists in the fact that they do not allow an effective and accurate control of the parameters that affect the quality of the metal powders that are formed. In particular, one of the fundamental parameters on which the quality of the metal powders obtained depends is the speed of the molten metal flow that comes out of the outflow opening of the tundish, speed that depends on the filling level of the tundish itself. In known plants and methods, the filling level of the tundish is indirectly controlled by acting on the inclination of the induction furnace crucible that feeds the tundish itself. Although the inclination of the crucible is electronically controlled from the outside, the control accuracy and precision and response times to the relative controls are in any case limited and affected by different factors, such as for example geometrical factors such as the shape of the outflow spout of the crucible or of the tilting system. Therefore, known atomization plants and methods do not allow ensuring an effective and constant control of the process parameters, such as for example the outflow speed of the molten metal, on which the quality of the metal powders depends.

Finally, in known atomization plants and methods there are increased explosion risks that jeopardize the safety of operators. These risks are mainly due to the fact that the induction melting furnaces, with their relative cooling systems generally crossed by water, are enclosed in closed chambers in close proximity to liquid metal baths, so any leaks could generate also violent explosions.

The aim of the present invention is to obviate the drawbacks of the known technique.

Within the scope of this general aim, the present invention provides a method and a plant for the production of metal powders by gas atomization that allow producing metal powders of the desired quality, that can be used in particular for additive production technologies (three-dimensional printing), starting from a wide range of metal materials that can be used as "raw materials", with contained production costs and increased performance and production efficiency.

It is another object of the present invention to provide a method and a plant for the production of metal powders by gas atomization that allow controlling the different individual production steps and the relative process parameters in a simple and effective manner.

It is another object of the present invention to provide a method and a plant for the production of metal powders by gas atomization that are particularly flexible and versatile, being able to be easily adapted to production changes, avoiding contamination risks between metal powders produced in sequence.

It is another object of the present invention to provide a method and a plant for the production of metal powders by gas atomization that allow reducing the energy expenditures and the use of water cooling circuits, with subsequent protection of the environment and of the working environments.

These objects according to the present invention are achieved with a method for producing metal powders by gas atomization as disclosed in claim 1.

These objects according to the present invention are achieved with a plant for producing metal powders by gas atomization as disclosed in claim 9.

Further characteristics are provided in the dependent claims.

The characteristics and advantages of a method and a plant for the production of metal powders by means of gas atomization according to the present invention will become more apparent from the following description, which is to be understood as exemplifying and not limiting, with reference to the schematic attached drawing, wherein:

FIG. 1 diagrammatically shows a production plant of metal powders by means of gas atomization according to the present invention.

With reference to FIG. 1, a production plant 100 of metal powders according to the present invention is shown.

The plant 100 comprises:

a melting station 101 for melting a metal charge in the solid state until obtaining a molten metal bath, a refining station 102 (i.e. secondary metallurgy) for refining the molten metal bath produced in the melting station 101, an atomization station 103 for atomizing the metal bath melted and refined in the refining station 102, and one or more ladles 104 that can be moved between the melting station 101, the refining station 102 and the atomization station 103.

The plant 100 may also comprise a classifying station 105 for classifying the metal powders produced in the atomization station 103 based on their grain size.

The melting station 101 comprises an electric-arc furnace 106 (EAF), it itself known and for this reason not described in detail.

The electric-arc furnace 106 comprises a shell 107 closed at the top by a roof 108 through which one or more electrodes 109 made of graphite are inserted in the shell 107. The electrodes 109 are supported at the upper end thereof external to the roof 108 by a support and movement system and are fed in alternating or direct current to generate, with the metal materials forming the charge in the shell 107 or with suitable anodes placed on the bottom of the shell 107, an electric arc which may be of the so-called "submerged" or "non-submerged" type in the metal charge in the shell 107.

The electric-arc furnace 106 is provided with one or more feed openings that may be obtained in the walls of the shell 107 and/or in the roof 108 and/or be formed by the same upper end of the shell 107 once the roof 108 is removed, to feed therethrough the charge of metal materials, together with possible additives, to be melted.

Feeding means of the metal materials and the additives forming the charge to be melted are operatively associated with such feed openings and may be configured to feed the materials in a continuous manner (such as for example, conveyor belts or of the vibration type or of the type known as Consteel® system) or a discontinuous manner ("batch") with bucket charging or other known systems.

Such feeding means are illustrated diagrammatically and are indicated with reference numeral 110 in the accompanying drawing.

The shell 107 also has a slag opening or channel 111 through which the layer of slag, which during the melting of the metal charge is generated and kept above the metal bath, is extracted from the shell 107 and collected in specific vessel 112.

The shell 107 also has a tapping opening 113 for tapping through it the molten metal bath that forms in the shell 107. The tapping opening 113 may have different shapes, such as for example a siphon, eccentric hole obtained on the bottom of the shell 107 or a spout, the shell 107 being supported by a tilting and inclining system.

The electric-arc furnace 106 is then equipped with sampling and control systems of the metal bath that forms therein, and with systems for injecting additive materials required to control the composition of the metal bath that forms therein, such as for example lances of oxygen or other additive.

The electric-arc furnace 106 and its operation are not further described, being of the type known to one skilled in the art.

The refining station 102 comprises at least one refining chamber 114 of the type that can be closed and equipped with systems for refining and controlling the molten metal bath, such as for example lances 115 for injecting oxygen (when necessary, for the conduction of the secondary metallurgy process), probes 116 for controlling the temperature, feed conduits 117 for feeding additive materials, and is associated with a system for generating a controlled atmosphere and/or vacuum conditions (VOD decarburization-oxygen-vacuum) in it, such as for example a system 118 of the pump type for generating vacuum, and/or overpressure.

Here too, the refining station 102 and its operation are not further described, being of the type known to one skilled in the art.

The atomization station 103 comprises at least one gas atomizer 119 that in turn comprises an upper closed chamber 120, that is that can be closed, and a lower closed chamber 121, one vertically overlapping the other and separated from each other by a plate 122.

The upper closed chamber 120 encloses therein a tundish 123 or hopper which is provided with heating means 124 that can be controlled from the outside of the upper closed chamber 120 and that are of the induction or electric resistance type.

At least one outflow opening 125 is obtained on the bottom of the tundish 123, the opening communicating with the lower closed chamber 121 through at least one corresponding through opening 126 obtained in the plate 122. The outflow opening 125 is associated with occlusion means 127, for example of the stem type, that can be controlled from the outside of the upper closed chamber 120.

A feeding conduit 140 is housed in the upper closed chamber 120 with an axial (lower) end leading into the tundish 123 and with the opposite axial (upper) end emerging out of the upper closed chamber 120. This feeding conduit 140 advantageously is made of ceramic material and is used for feeding the refined molten metal bath contained in the ladle 104 directly in the tundish 123, thus avoiding that it comes in contact with the ambient air so as to limit any risks of oxidation thereof, if necessary.

The upper closed chamber 120 is connected to a vacuum generating system 128 of the pump type adapted to generate desired vacuum conditions therein.

The lower closed chamber 121 comprises at least one nozzle 129 which is connected to feeding means 130 for feeding such nozzle 129 with an atomization inert gas of the argon, nitrogen or helium type.

Advantageously, one or more nozzles 129 are obtained in the plate 122 close to the opening 126 communicating with the outflow opening 125.

It is not excluded for other nozzles 129 to be provided inside the lower closed chamber 121.

The bottom 121a of the lower closed chamber 121 advantageously is cone-shaped to collect therein metal powders that form, and is associated with discharging means 131, for example of the pneumatic type, for discharging metal powders.

The discharging means 131 are connected with the classifying station 105 in which there are provided one or more separators 132, for example cyclone, sieve or other separators, for the separation of the metal powders in at least one first fraction and one second fraction, wherein the metal particles of the first fraction have a desired grain size and the metal particles of the second fraction have a grain size different from the desired one. The separator 132 is provided with an inlet associated with the discharging means 131, and with an outlet associated with collecting means of the two fractions of powders thus classified and separated. The plant 100 further comprises level sensors for detecting the filling level of the tundish 123 which are operatively connected with a control unit for keeping the value of the filling level of the tundish 123 above a predefinable minimum threshold value. Under steady operating conditions, maintaining the filling level of the tundish above a minimum threshold value allows to ensure a continuity of the flow of the molten metal bath that flows from the tundish 123 into the lower closed chamber 121 of the atomizer. This allows conducting the atomization with continuity and without interruptions, also during the execution of the melting and refining steps—which are conducted in separate stations from the atomization station 103—and during the pouring or topping up step.

The upper closed chamber 120 and the lower closed chamber 121 are then equipped with known control systems, for example of the temperature or of other process parameters.

Here too, the atomization station 103 and the separation station 105 and their operation are not further described, they being of the type immediately comprehensible to one skilled in the art.

Advantageously, the conical bottom portion 121a of the lower closed chamber 121 is of the type that can be completely replaced with other similar and new portion, that is, in particular, if metal powders of different nature or quality are to be produced in sequence.

Likewise, in case of production change, also the discharging means 131, the separator 132, the upper closed chamber 120, or at least the tundish 123 therein, and the relative feeding conduit 140 can be replaced with similar discharging means, separator, upper closed chamber, or tundish, and the relative feeding conduit all of new type.

Each ladle 104 consists of a vessel covered internally with refractory material.

In a preferred embodiment, each ladle 104 has, on the bottom thereof, a discharge mouth 134 conveniently calibrated and which is associated with closure means 135 that can be controlled from the outside.

Advantageously, these closure means 135 are of the gate type controlled by a linear actuator.

Advantageously, the ladle 104 is also at least partly heated, for example by induction or electrical resistance, and, in particular, it is heated close to or at the discharge mouth 134 thereof so as to ensure keeping the metal bath contained therein in the melted state and/or at the desired temperature conditions.

When the ladle 104 is in the atomization station, it is supported above the upper closed chamber 120 in such a position whereby, when open, the discharge mouth 134 thereof is in communication with the upper end of the feeding conduit 140 which emerges outside the upper closed chamber 120 so as to pour the refined molten metal bath contained therein directly into the tundish 123.

However, alternative embodiments of the ladle 104 are not excluded, which may be provided with other systems for transferring the molten metal contained therein into the tundish 123; for example, the ladle 104 could be provided with a transfer spout and be associated with a tilting system or a transfer siphon.

The plant 100 comprises a plurality of ladles 104, each movable between the melting station 101, the refining station 102 (if present) and the atomization station 103, for collecting the molten metal bath tapped from the electric-arc furnace 106, containing the molten metal bath during the refining thereof inside the refining chamber 114 and pouring the refined molten metal bath into the tundish 123 by means of the feeding conduit 140, respectively.

A removable cover 136 is applied at the top of the ladle 104.

The plant 100 described above is configured to implement the production method of metal powders by means of gas atomization according to the present invention.

The production method of metal powders by means of gas atomization according to the present invention comprises:
a) providing a metal charge comprising at least one metal material selected from the group comprising metal scraps, metal minerals and metal powders;
b) melting the metal charge inside the electric-arc furnace 106 controlling its composition until a molten metal bath having a desired composition is obtained;
c) tapping the molten metal bath from the electric-arc furnace 106, collecting it inside at least one ladle 104;
d) atomizing the molten metal bath tapped from the electric-arc furnace 106 by feeding the molten metal bath tapped from the electric-arc furnace 106 into a gas atomizer 119, inside which a molten metal bath flow is produced, and impinging such molten metal bath flow with an atomization inert gas stream for the atomization of the molten metal bath into metal powders;
e) extracting the thus obtained metal powders from the gas atomizer 119.

The method according to the present invention further comprises, after said tapping step c) and before said atomizing step d), the step of:
c1) refining the molten metal bath collected in the ladle 104, until obtaining a refined molten metal bath.

If for example, ferrous or steel metal powders are to be produced, the refining step may provide a step of decarburization with methods and processes known to one skilled in the art, such as for example the VOD technique.

At the end of the refining step, the metal bath contained by the ladle is isolated from the oxidizing agents by means of suitable protecting means. In one embodiment, a layer of protective slag isolating the refined molten metal bath with respect to the atmosphere of the environment outside the ladle is formed on the refined molten metal bath during and/or after the refining step.

In particular, the atomization step d) comprises:
pouring the refined molten metal bath directly from the ladle 104 into the gas atomizer 119, in which the refined molten metal bath is poured by the ladle 104 directly into the tundish 123 by means of the feeding conduit 140 that crosses the upper closed chamber 120,
letting the refined molten metal bath contained in the tundish 123 flow into the lower closed chamber 121 through the at least one outflow opening 125 and, simultaneously, feeding the nozzles 129 with an atomization inert gas so that the molten metal flow flowing out of the outflow opening 125 is impinged by the inert gas stream coming out of the nozzles 129, thus atomizing and solidifying in the shape of metal particles inside the lower closed chamber 121,
extracting the metal powders formed in the lower closed chamber 121, by means of the discharging means 131.

From the above, it is immediately apparent that the method according to the present invention does not provide—but rather excludes—any step of solidifying the metal bath intermediate to the melting step b) of the raw materials in the electric-arc furnace 106 and to the atomization step d) in the gas atomizer 119. The molten metal bath tapped from the electric-arc furnace 106 indeed is collected in a ladle 104 that contains it during the refining step c1), at the end of which, except any stop times, it feeds it directly into the gas atomizer 119. In other words, no intermediate solidifying step is provided between the melting step b) of the raw materials and the atomization step d) of the refined molten metal bath, which has quite a different composition than the one of the raw materials (the latter partly consisting of metal scraps and metal minerals).

The method according to the present invention also provides:
e) classifying the metal powders extracted from the gas atomizer 119 and, in particular from the lower closed chamber 121 of it, based on the grain size thereof by separating them in at least one first fraction and one second fraction, wherein the metal particles of the first fraction have a desired grain size and the metal particles of the second fraction have a grain size different from the desired one, and advantageously
f) recycling the second fraction of metal particles as materials for the composition of the metal charge that can be fed into the electric-arc furnace 106 for conducting a new production cycle.

In greater detail, the method according to the present invention is provided for producing metal powders of iron, steel, nickel, chromium, cobalt, molybdenum and their alloys, but not aluminium or titanium metal powders.

The metal materials forming the metal charge to be melted comprise at least one material selected from the group comprising metal scraps, metal minerals and metal powders. If, for example, metal powders of iron or steel are to be produced, as known, these metal materials (metal scraps and metal minerals) have a very variable composition rich with undesired elements in the final composition of the metal powders to be obtained, such as for example carbon, which may reach percentages that are even ten times higher than the ones of the final product. Such materials also have variable and any shapes and dimensions.

Such materials are continuously and discontinuously fed in the desired proportions and quantities inside the electric-arc furnace 106 where they are melted by the radiation, convection and conduction heat that is generated inside the furnace and the molten metal bath formed therein due to the feeding of electric energy to the electrodes 109 with the formation of a submerged or non-submerged electric arc.

During the running of the electric-arc furnace 106, the temperature, the volume and the composition of the molten metal bath formed therein are controlled and, when necessary, modified with interventions of the type known to one skilled in the art (such as, for example, adding raw materials, additives, oxygen, etc.) until obtaining a molten metal bath of desired volume, temperature and composition.

In particular, during the melting step conducted in the electric-arc furnace 106, it is possible to intervene with known systems to modify and control the composition of the molten metal bath formed therein.

The molten metal bath obtained is then tapped from the electric-arc furnace 106 and collected in a ladle 104.

The molten metal bath collected in the ladle 104 is then refined (i.e. processes of so-called secondary metallurgy), such as for example decarburization by means of oxygen injection which advantageously is conducted under conditions of vacuum, controlled atmosphere or overpressure according to the needs, by introducing the ladle 104 into the refining chamber 114 where the desired conditions, for example vacuum, are created. This allows promoting the extraction of undesired gases, for example hydrogen, nitrogen or others, from the molten metal bath.

During the refining step (secondary metallurgy), it is possible to periodically check the temperature of the molten metal bath and the composition thereof by analysing samples or the gases extracted from the closed refining chamber 114.

Once the refining step is complete, before the conditions of vacuum or controlled atmosphere in the closed refining chamber 114 are removed, when necessary, suitable protecting means are implemented on the ladle 104 in order to avoid oxidation or contaminations.

In a particular embodiment, it is possible to generate a layer of protective slag on the refined molten metal bath contained in the ladle 104 such as to isolate it from the atmosphere of the external environment.

Air or an inert gas is blown into the closed refining chamber 114 and after removing the upper closure thereof, the ladle 104 is extracted therefrom and transported towards the atomization station 103.

The ladle 104 containing the refined molten metal bath and/or covered by the layer of protection slag is arranged above and outside the upper closed chamber 120 of the atomizer 119 so that the discharge mouth 134 thereof communicates with the upper end of the feeding conduit 140. The level of opening of the discharge mouth 134 is controlled by the closure means 135. In particular, it is worth noting that the refined molten metal bath flows from the bottom of the ladle 104 in the form of a vertical flow directed downwards, which is channeled into the feeding conduit 140. Such flow is controlled in a simple and accurate manner by adjusting the level of opening of the discharge mouth 134 by means of the relative closure means 135.

However, alternative embodiments are not excluded wherein the metal bath contained in the ladle 104 is fed into the atomizer 119 for example by means of a spout obtained in the ladle itself and an inclination system thereof or by means of siphons or the like.

The refined molten metal bath is thus fed directly from the ladle 104 into the tundish 123 where it is kept at the desired atomization temperature due to the heating means 124. A controlled atmosphere of inert gas or vacuum conditions is produced inside the upper closed chamber 120, where the tundish 123 is located.

The occlusion means 127 are controlled to free the outflow opening 125 when the desired filling level of the tundish 123 is reached: a flow of possibly refined molten metal flows from the tundish 123 into the lower closed chamber 121 where it is impinged by the stream formed by the jets of inert gas injected by means of the nozzles 129.

In conditions of steady operation, the filling level of the tundish 123 is kept at values exceeding a predefinable minimum threshold value. Thereby, the molten metal bath flow that flows from the tundish 123 into the lower closed chamber 121 through the outflow opening 125 is continuous, that is it is continuous over time so that the atomizer operates uninterruptedly, also during the running of the melting and refining steps, which are performed in separate stations. The possibility of conducting the atomizer continuously while keeping the filling level of the tundish 123 above a minimum threshold is subsequent to:

the fact that the melting b), refining c1) and atomization d) steps are conducted in separate stations and that therefore they may operate at steady operation at the same time;

the fact that the refined molten metal bath contained in a ladle 104 is not poured therefrom directly into the true atomizer (i.e. the lower closed chamber 121 wherein the atomization occurs), rather into a tundish 123 that feeds the latter; the tundish 123 therefore acts as a "storage reservoir" or "tank" for feeding the lower closed chamber 121;

the fact that there is provided a plurality of ladles 104 operating between the different melting, refining and atomization stations so as to ensure the continuity of the process.

In a known manner, the molten metal flow is pulverized forming particles that take on a generally spherical shape and cool off by collecting on the bottom of the lower closed chamber 121, from where they are extracted by means of the discharging means 131.

The metal powders thus formed and extracted are subjected to grain size classification with known technologies and systems, and are separated into at least two fractions: one of desired grain size and a scrap one.

The latter advantageously is recycled as material for forming metal charge for feeding the electric-arc furnace 106 for conducting successive production cycles.

In particular, it is known that the melting, refining and atomization steps occur—at least for a given time interval—at the same time at steady operation, each of them being conducted in a station that is separate and distinct from the others, respectively a melting station, a refining station and an atomization station.

The method and the plant according to the present invention therefore have the advantage of being capable of conducting several production cycles at the same time and, although the times of each atomization cycle are substantially comparable with the ones according to the known technique, the overall productivity of the method and of the plant according to the present invention is at least double the one according to the known technique.

Indeed, it is not necessary to wait for an atomization cycle to end before starting another one, the different steps wherein such cycle develops being capable of being conducted at the same time and separately from one another. As noted above, this, combined with the provision of the tundish acting as "storage reservoir" or "feed tank" of the refined molten metal bath to be atomized, among other things allows conducting the true atomization in a continuous manner, without any interruption.

The conducting of the melting step of the metal charge in an electric-arc furnace melting station and the conducting of the refining step (decarburization) of the molten metal bath in a specific and separate refining station allow broadening the range of metal materials that can directly be used as "raw materials" for producing metal powders by gas atomization. The method and the plant according to the present invention indeed allow producing metal powders by gas atomization directly (that is without further intermediate solidification and re-melting steps) starting from metal materials in the liquid state such as metal scraps, metal minerals and the scrap metal powders themselves, also having significantly different composition than the one of the metal powders to be produced, in particular in terms of impurities, and variable and heterogeneous shapes and dimensions. It is also worth noting that it is not possible to use scrap metal powders as charging material in known atomization plants because the induction furnaces used in such known atomization plants are not capable of melting such raw materials due to how the plants are sized and conducted.

The method and the plant according to the present invention therefore also allow using, as "raw materials" (i.e. inlet metal charge), less precious and costly metal materials than those normally used for producing metal powders by gas atomization. In particular, the method and the plant according to the present invention allow using metal materials as "raw materials", such as metal scraps and metal minerals, having various and heterogeneous composition also containing increased percentages of impurities with respect to the composition of the metal powders to be obtained, in any case being it possible to control the composition of the metal bath during the conducting of the melting and refining steps to obtain metal powders of the desired composition and quality. This without it being necessary to conduct any intermediate solidification and successive re-melting step; indeed although they start from raw materials having a different composition (in particular in terms of impurities) from the one of the atomized powders obtained, the method and the plant according to the present invention provide for a single melting step and successive direct atomization of the refined molten metal bath without the same being subjected to further solidification and re-melting.

The metal powders produced with the method and the plant according to the present invention can be used in particular with raw materials for additive production technologies (three-dimensional printing).

The method and the plant according to the present invention also allow reducing the energy expenditure of the whole production cycle which is broken down into a single melting-refining-atomization cycle, while the methods and production plants of metal powders by gas atomization according to the known technique use "raw materials" (i.e. an inlet metal charge) that were already the subject of a preceding and separate melting-refining-forming/solidification cycle that is added to the melting-refining-atomization one conducted with them. Therefore, this results in a reduction of the pollutant emissions (carbon dioxide) into the atmosphere, to the greater protection of the environment. In a preferred embodiment, the method and the plant according to the present invention also allow optimally controlling the quality of the metal bath poured into the tundish that feeds the atomizer and the filling level of the tundish itself. The refined molten metal bath contained in the ladle indeed is no longer poured into the tundish by inclining the ladle itself, an operation that could result in the pouring of slag into the tundish and that is difficult to control. Contrarily, according to a preferred embodiment of the present invention, the metal bath contained in the ladle is poured into the tundish by means of a discharge mouth obtained on the bottom of the ladle itself, without the need to incline it, and thus controlling the level of opening thereof by means of the respective closure means. An increased control of the quality of the metal bath contained in the tundish and of the filling level of the latter allows controlling the parameters of the atomization process and therefore, the quality of the metal powders obtained therewith. The control of the filling level of the tundish also allows conducting the atomization in a continuous manner.

Moreover, the atomization station according to the present plant is overall less bulky, in particular in height, and safer, since water cooling circuits are not provided close to molten metal baths.

Finally, the method and the plant according to the present invention allow managing production changes in a relatively simple and quick manner while ensuring that metal powders of the desired quality are obtained.

Should it indeed be necessary to produce metal powders of different quality or type, it is possible to use new ladles and rather than proceeding with long and demanding cleaning operations, completely replacing the portion of bottom of the lower closed chamber of the atomizer, together with the relative discharging means and separators, and the upper closed chamber, or at least the tundish therein contained, together with the relative feeding conduit. Thereby, any risk of contamination between the different metal powders is avoided.

The invention thus conceived is susceptible to several modifications and variations, all falling within the invention; moreover, all the details can be replaced by technically equivalent elements. In practice, the materials used, as well as their dimensions, can be of any type according to technical requirements.

The invention claimed is:

1. A method for producing metal powders by gas atomization, except for aluminium metal powders and titanium metal powders, the method comprising:
   a) providing a metal charge comprising at least one material selected from a group consisting of metal scraps, metal minerals, and metal powders;
   b) melting the metal charge inside an electric-arc furnace, controlling a composition of the metal charge until a molten metal bath having a desired composition is obtained;
   c) tapping the molten metal bath from the electric-arc furnace, collecting the molten metal bath inside at least one ladle;
      c1) refining the molten metal bath collected in the at least one ladle, until a refined molten metal bath is obtained, the refining step c1) being performed under controlled atmosphere or vacuum or overpressure condition, by introducing the at least one ladle, containing the molten metal bath tapped from the electric-arc furnace, into a closable refining chamber, inside which the controlled atmosphere or the vacuum or the overpressure condition is generated;
   d) atomizing the molten metal bath, tapped from the electric-arc furnace and refined, by feeding the molten metal bath into a gas atomizer, inside which a molten metal bath flow is produced, and impinging the molten metal bath flow with an atomization inert gas stream, for the atomization of the molten metal bath into metal powders; and e) extracting the obtained metal powders from the gas atomizer, wherein the atomizing step d) comprises:

pouring the molten metal bath from the at least one ladle into the gas atomizer, wherein the gas atomizer comprises an upper closed chamber and a lower closed chamber, one vertically on the other, wherein the upper closed chamber houses a tundish, which is provided with heating means controllable from outside and, on a bottom thereof, with at least one outflow opening that communicates with the lower closed chamber, and wherein the lower closed chamber comprises at least one nozzle, which is fed with the atomization inert gas, and is associated with means for discharging the metal powder formed therein, wherein the molten metal bath is poured from the at least one ladle directly into the tundish through a feeding conduit that passes through the upper closed chamber, and making the molten metal bath contained in the tundish flow into the lower closed chamber through the at least one outflow opening so as to form the molten metal bath flow and, simultaneously, feeding the at least one nozzle with the inert gas so that the molten metal bath flow flowing out of the at least one outflow opening is impinged by the inert gas stream exiting from the at least one nozzle, the molten metal bath flow is thus atomized and solidified in a form of metal particles inside the lower closed chamber.

2. The method according to claim 1, wherein the refining step c1) comprises protecting the molten metal bath from oxidizing agents or contaminants.

3. The method according to claim 2, wherein the protecting the molten metal bath consists of forming a layer of protective slag, which is formed on the refined molten metal bath during the refining step c1).

4. The method according to claim 1, wherein, for at least a certain time of steady operation, the steps of melting a), atomizing d), and refining c1) are performed simultaneously.

5. The method according to claim 1, further comprising:

f) classifying the obtained metal powders extracted from the gas atomizer based on a grain size thereof, by separating the obtained metal powders in at least one first fraction and one second fraction, wherein the obtained metal particles of the first fraction have a desired grain size and the obtained metal particles of the second fraction have a grain size different from the desired grain size; and g) recycling the second fraction of the obtained metal particles as material for the composition of the metal charge.

6. The method according to claim 1, wherein the feeding into the gas atomizer of the molten metal bath contained in the at least one ladle is performed by means of at least one discharge mouth that is obtained on a bottom of the at least one ladle and that is associated with closure means controllable from outside, the molten metal bath contained in the at least one ladle exiting from the at least one discharge mouth when the at least one discharge mouth is open, in a form of a vertical flow directed downwards.

7. The method according to claim 6, wherein the at least one discharge mouth of the at least one ladle, when the at least one discharge mouth is open, communicates with an end of the feeding conduit emerging out of the upper closed chamber.

8. The method according to claim 1, wherein at steady operation a filling level of the tundish is maintained at values greater than a minimum threshold value sufficient to ensure a continuity of flow of the molten metal bath from the tundish, the molten metal bath flowing from the tundish into the lower closed chamber through the at least one outflow opening being continuous, the gas atomizer operating uninterruptedly.

* * * * *